June 10, 1930. F. D. FOWLER 1,763,297
MACHINE FOR COVERING TIRE BEADS
Filed Jan. 7, 1928 5 Sheets-Sheet 2
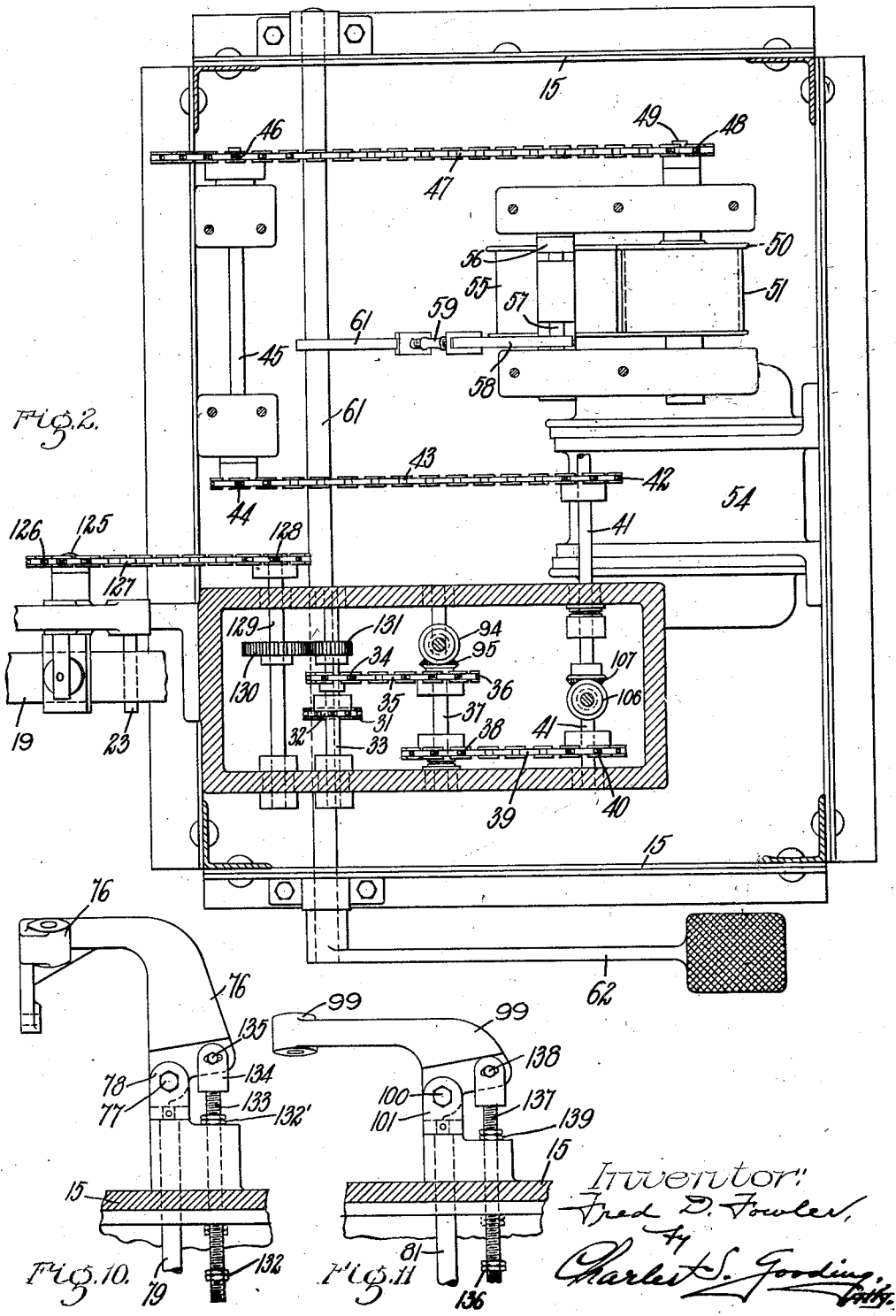

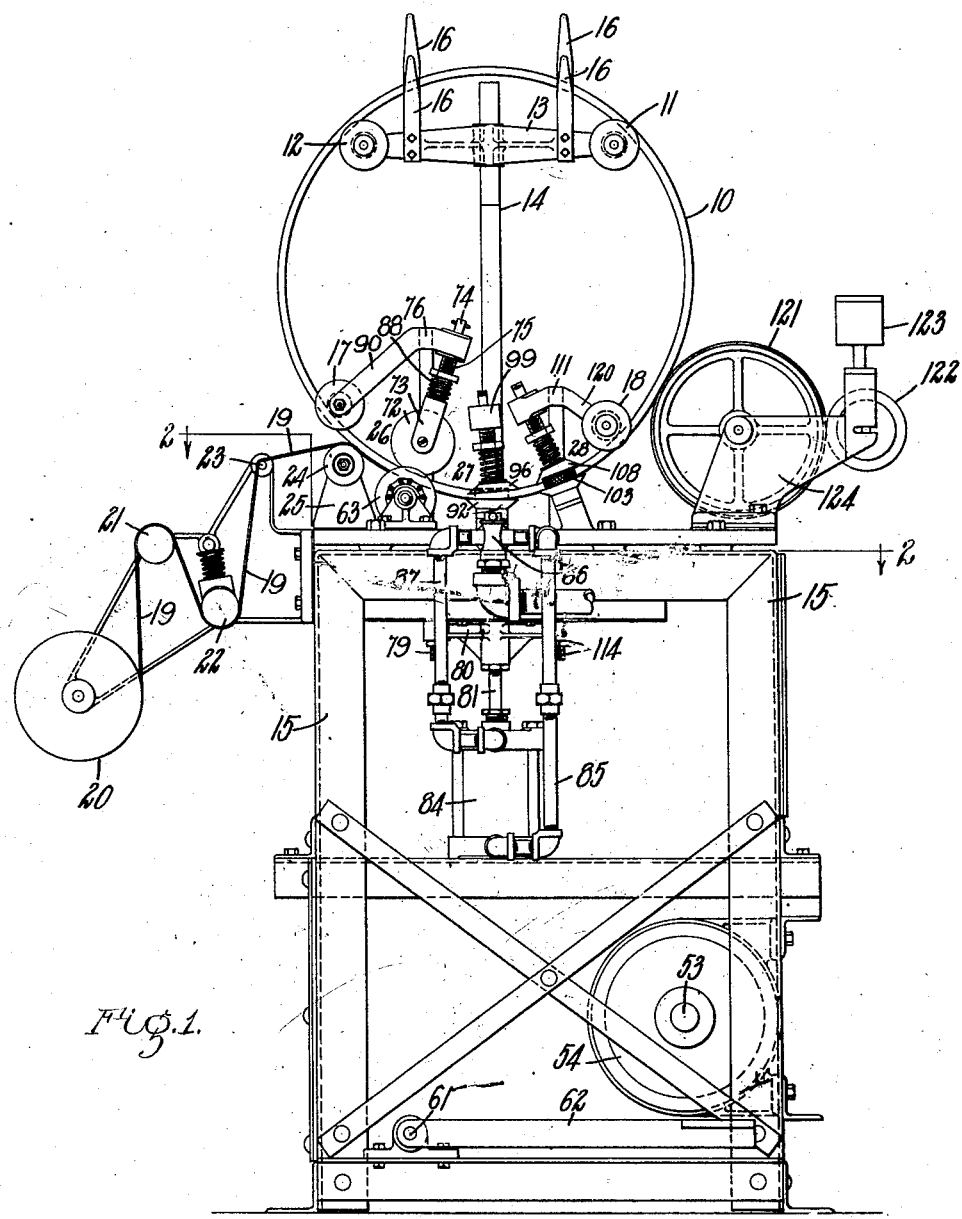

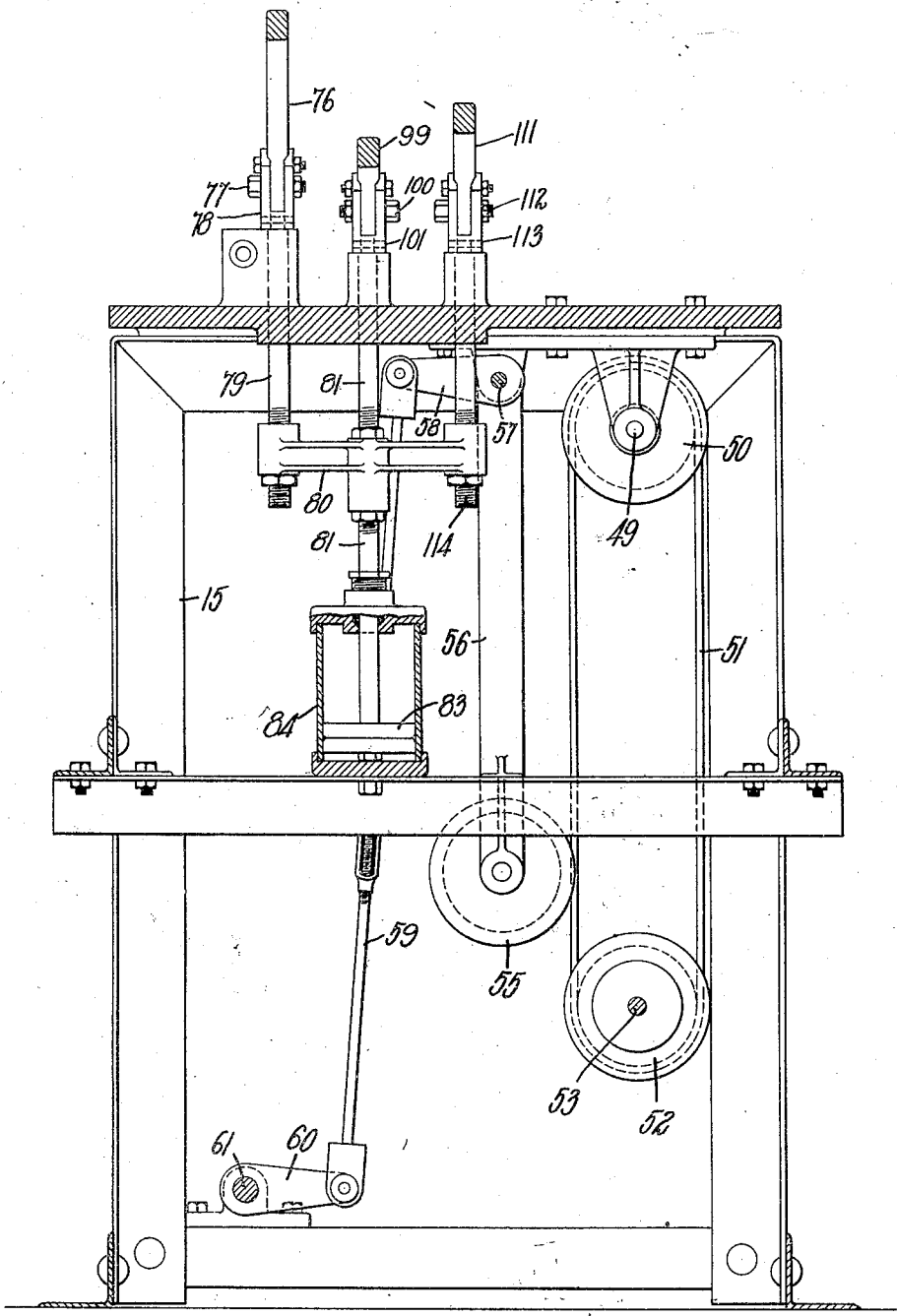

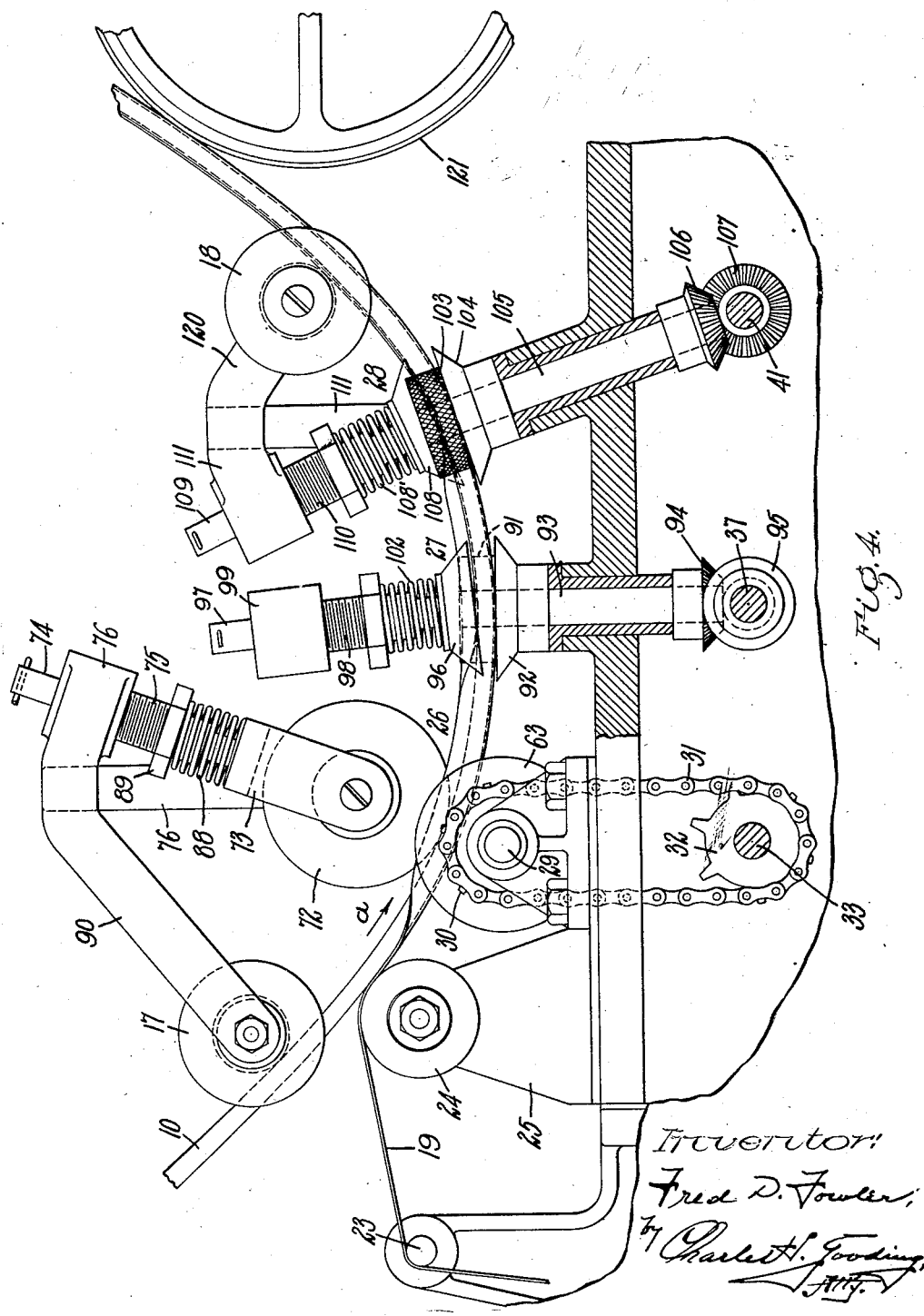

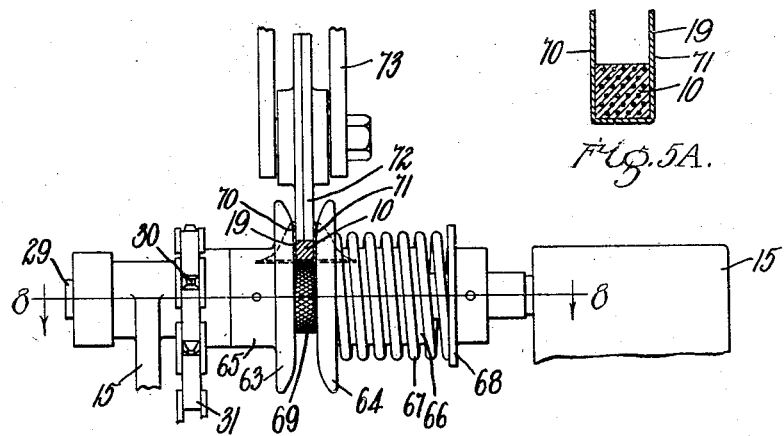

Patented June 10, 1930

1,763,297

UNITED STATES PATENT OFFICE

FRED D. FOWLER, OF NEWTON, MASSACHUSETTS, ASSIGNOR, BY MESNE ASSIGNMENTS, TO HOOD RUBBER COMPANY, INC., OF WILMINGTON, DELAWARE, A CORPORATION OF DELAWARE

MACHINE FOR COVERING TIRE BEADS

Application filed January 7, 1928. Serial No. 245,105.

This invention relates to a machine for covering beads for automobile tires and is especially adapted for covering with fabric the type of bead known as straight side. The core of the tire bead which is to be covered with fabric is in the shape of a ring and when placed in the machine is suspended and guided during the covering operation by rolls. The fabric for covering the core is fed into contact with the outer perimeter of the core ring and is folded around the ring by three folding units. Finally the machine is equipped to print any desired matter upon the fabric on the periphery of the ring. Those portions of the folding units located within the ring during the folding operation are capable of being moved away from the other portions and toward the center of the ring in order that a ring may be easily introduced into the machine or taken out thereof.

The mechanism for feeding the fabric to the ring is substantially the same as the mechanism for feeding the fabric for which I have made application for United States Letters Patent filed November 30, 1927, Serial No. 236,734, entitled "Feed mechanism for sheet material".

The invention consists in a machine for covering tire beads such as hereinafter set forth in the specification and particularly as pointed out in the claims.

Referring to the drawings:—

Figure 1 is a front elevation of my improved machine for covering tire beads with a tire bead ring positioned therein Fig. 2 is a plan view of the driving mechanism which rotates the feed rolls for the fabric and ring.

Fig. 3 is a sectional elevation viewed in the same direction as Fig. 1, illustrating the mechanism for raising and lowering certain portions of the folding units to carry them away from or toward the bead and also a portion of the driving mechanism.

Fig. 4 is an enlarged front elevation partly in section of the different guiding and folding and feeding means.

Fig. 5 is an end elevation viewed from the right of Fig. 1 illustrating the first folding unit with the bead core and fabric cover in section.

Fig. 5A is a detail section of the bead core and the fabric partly folded therearound by the mechanism of the first folding unit illustrated in Fig. 5.

Fig. 6 is an elevation of the second folding unit illustrating the bead core and fabric cover in section as it appears in that unit.

Fig. 6A is an enlarged detail section of the core bead and fabric covering as it is folded by the second unit.

Fig. 7 is a detail elevation of the third folding unit with the bead core and the fabric covering in section.

Fig. 7A is a detail section illustrating the bead core and fabric completely folded around it to form the completed bead as it is left by the third folding unit of Fig. 7.

Fig. 8 is a sectional elevation taken on line 8—8, Fig. 5.

Fig. 9 is a sectional elevation viewed from the right of Fig. 1, the frame being shown in section and illustrating the upper portion of one of the folding units in full and dotted lines in three positions.

Figs. 10 and 11 are sectional elevations viewed from the right of Fig. 1 illustrating the upper portion of two of the folding units, these figures being similar to Fig. 9.

Like numerals refer to like parts throughout the several views of the drawings.

In the drawings, 10 is the bead core which is to be covered with fabric. 11 and 12 are guide rolls supported upon a cross head 13 which is fastened to a standard 14 supported upon the frame 15 of the machine. Guide fingers 16 bear against opposite sides of the bead core 10 to guide the same. The bead core 10 is further guided by grooved rolls 17 and 18. A strip of fabric 19 is fed from a roll 20 of the same over a guide roll 21, then downwardly beneath an auxiliary feed roll 22, then upwardly and over another guide roll 23, and thence to a groove guide roll 24 rotatably mounted upon a bracket 25 fast to the frame 15. The guide roll 24 guides the strip of fabric against the periphery of the bead core 10.

The feeding and folding units are three in number, 26, 27 and 28. The feeding unit 26 is illustrated in detail in Figs. 5 and 8 and consists of a shaft 29 which is rotatably mounted in bearings in the frame 15 and is driven by a sprocket gear 30 fast thereto and connected by a sprocket chain 31 to a sprocket gear 32, Fig. 4. The sprocket gear 32 is fastened to a shaft 33 which has a sprocket gear 34 fast thereto (Fig. 2) driven by a sprocket chain 35 from a sprocket gear 36 fast to a shaft 37 which has a sprocket gear 38 fast thereto connected by a sprocket chain 39 to another sprocket gear 40 fast to a shaft 41. The shaft 41 has a sprocket gear 42 fast thereto driven by a sprocket chain 43 from a sprocket gear 44 fast to a shaft 45 which has a sprocket gear 46 fast thereto driven by a sprocket chain 47 which, in turn, is driven by a sprocket gear 48 fast to a shaft 49, to which is also fastened a pulley 50 connected by a belt 51, Fig. 3, to another pulley 52 which is fast to a shaft 53 of an electric motor 54.

The belt 51 is provided with a tightener 55 which is rotatably mounted at the lower end of an arm 56 fast to a rock shaft 57 to which an arm 58 is also fastened. The arm 58 is connected by an adjustable link 59 to an arm 60 which is fastened to a treadle shaft 61 which is rocked by a treadle 62 to move the belt adjustable pulley 55 toward and away from the belt 51, thus increasing or diminishing the speed of rotation at which the different driving mechanisms connected to the shaft 29, as hereinbefore described, may be operated.

The shaft 29, Fig. 8, has a pair of oppositely disposed flanges 63 and 64, the flange 63 having a hub 65 thereon which is fastened by a pin to the shaft 29. The flange 64 has a hub 66 thereon which is slidably mounted on the shaft 29 and is moved toward the flange 63 by a spring 67 which bears at one end against the flange 64 and at the other end against a collar 68 fast to the shaft 29. The shaft 29 has fastened thereto or integral therewith a knurled flange 69 upon which the bead core is supported, together with the strip of fabric 19 which is superimposed upon the core 10. The core and the fabric are pressed downwardly against the flange 69, so that as they are fed forward in the direction of the arrow $a$, Fig. 4, the two opposite side portions 70 and 71 are folded by engagement with the flanges 63 and 64 respectively into an upright position as illustrated in Figs. 5 and 5A, with the side portions 70 and 71 bearing against opposite sides of the core 10.

The core and the fabric are pressed downwardly as hereinbefore set forth by a feed roll 72 which is rotatably mounted upon a bifurcated holder 73 which is provided with a shank 74 slidably mounted in a sleeve 75 having screw-threaded engagement with a rocker frame 76 which is pivoted at 77 to a bracket 78 fast to a vertical plunger 79, the lower end of which is adjustably fastened to a cross head 80 which is also adjustably fastened to the plunger 81 of an air cylinder 84. The plunger 81 has a piston 83 fast thereto and reciprocatively positioned in the cylinder 84, Figs. 1, 3, 4 and 10.

Air is admitted to the air cylinder 84, see Fig. 1, from a pipe 85 which leads to a valve 86. The upper end of the air cylinder 84 is connected by a pipe 87 to the air valve 86, so that by turning the air valve in one direction, the piston 83 may be moved upwardly and in the opposite direction the said piston may be moved downwardly carrying with it the cross head 80, the plunger 79, the bracket 78 and rocker frame 76, together with the roll 72.

When the rocker frame 76 is moved upwardly by the rod 79, as hereinbefore set forth, it will be tipped toward the right, Fig. 10, by reason of the engagement of nut 132 engaging the frame 15, the nut 132 having engagement with a screw-threaded rod 133 having a bifurcated head 134 thereon pivotally connected at 135 to the rocker frame 76. Thus as the rocker frame 76 and the parts thereon are raised by the plunger 79, the rocker frame will be tipped backwardly as well as raised and thus enable the bead core to be easily inserted in the machine to have the fabric strip attached thereto. When the plunger 79 moves downwardly a nut 132' will engage the frame 15 and return the parts to the positions illustrated in Fig. 10.

The roll 72 is held against the bead with a yielding pressure due to the spring 88 which is interposed between a nut 89 on the sleeve 75 and the holder 73, thus the roll 72 may be held against the bead with a yielding pressure, which pressure can be regulated by means of the nut 89.

On the rocker frame 76 there is provided an arm 90, Fig. 4, upon which is rotatably mounted the grooved guide roll 17.

From the folding unit 26 the bead core and the strip of fabric are fed to the second folding unit 27 and are positioned in relation to that unit as illustrated in detail in Fig. 6. This folding unit consists of a knurled horizontal feed roll 91 which has a frusto-conical flange 92 integral therewith, both being fastened to a shaft 93, see Fig. 4, to the lower end of which is fastened a bevel gear 94 which meshes into a bevel gear 95 fast to the shaft 37, which is rotated as hereinbefore described.

A frusto-conical rotatable folding member 96 is fastened to a shaft 97 which is slidably mounted in a sleeve 98 having screw-threaded engagement with a rocker frame 99, Fig. 11, which is pivoted at 100 to a bracket 101 fast to the vertical plunger 81 to which the piston 83 is fastened, which is operated as hereinbefore described. The rotary folding member 96 is held with its lower face downwardly just above the bead core 10 with a yielding pressure by the spring 102, as illustrated in Fig. 6, and when the bead, with the fabric folded partly around it as illustrated in Fig. 5 and Fig. 5A, arrives at the folding member 96, it will fold the side 71 of the fabric over toward the feed roll 91 and against the inner perimeter of the bead core 10. By reference to Fig. 4 it will be seen that the conical folder 96 is positioned at an angle to the frusto-conical flange 92 of the feed roll 91 and that the periphery of the folder lies in a plane which intersects the inner perimeter of the bead and diverges rearwardly and inwardly therefrom from the line of intersection thereof. The object of this inclined position of the folder 96 is so that as the folder rotates it will first fold the portion 71 of the fabric over the bead 10 and then as it continues its rotation it will diverge from the fabric so folded in order that it may not push the fabric which it has previously folded over the core, off of the core. It will be seen that the median axial lines of the feed roll 91 and of the folder 96 lie in planes at an angle to each other and, furthermore, it will be noted that the median axial line of the feed roll 91 is approximately radial to the bead and the median axial line of the folder 96 lies in a plane intersecting the axis of the feed roll, whereby the result in folding the portion 71 of the fabric over the core 10 without subsequently removing it therefrom is attained.

The bead core and the fabric covering therefor, in the shape illustrated in Figs. 6 and 6A, are now fed forward to the third folding unit illustrated in detail in Fig. 7.

When the plunger 81 moves upwardly the rocker frame 99 will also be moved upwardly until the nut 136 engages the frame 15, whereupon the rocker frame 99 will be tipped backwardly as well as moved upwardly by reason of the rod 137, which is pivotally connected at 138 to said rocker frame, causing the rocker frame to tip on the pivot 100 when it comes to a stop in its upward movement on account of the nut 136 engaging the frame 15. When the plunger 81 moves downwardly the nut 139 will engage the frame 15 and the rocker frame will thus be brought back to the position illustrated in Fig. 11. This operation being substantially the same as that described in relation to the movement of the rocker frame 76 and for the same purpose, namely, to render it easy to introduce the bead ring into the machine or to take it out of the machine.

The folding unit 28 consists of a feed roll 103 which has a frusto-conical flange 104 thereon, the same being fastened to a shaft 105, see Fig. 4, to the lower end of which is fastened a bevel gear 106 driven by another bevel gear 107 fast to the shaft 41 which is rotated in the manner hereinbefore described.

Coacting with the feed roll 103 and its flange 104 is a rotary folding member 108 which is fastened to a shaft 109, the shaft 109 being slidably mounted in a sleeve 110 having screwthreaded engagement with a rocker frame 111. The rotary folding member 108 coacts with the feed roll 103 and its flange 104 to fold the portion 70 of the fabric over the portion 71, as illustrated in Fig. 7A, in the same manner as the folder 96 coacts with the feed roll 91 to fold the portion 71 of the fabric over the core 10, and it will be seen by reference to Fig. 4 that the folder 108 is angularly positioned relatively to the flange 104 on the feed roll 103 as hereinbefore set forth in relation to the folder 96 and its angular relation to the feed roll 91 and its flange 92 and this is for the same purpose in order that the folder may not remove the fabric from the bead after once having positioned it thereon. The rocker frame 111 is illustrated in Fig. 4 and is also illustrated in full and dotted lines, Fig. 9, the same being pivoted at 112 to a bracket 113 fast to a vertical plunger 114 which is adjustably fastened at its lower end to the cross head 80 from which it receives a reciprocatory motion by means of the plunger 81 and piston 83 as hereinbefore described.

It will be noted that the rocker frame 111 has a plunger 115 connected thereto by a pin 116 and bifurcated head 117. The plunger 115 is slidably mounted in the frame 15 of the machine and has stop nuts 118 and 119 screwthreadedly mounted thereon. When the parts are in the relative positions illustrated in Fig. 9 and the rocker frame in its full position, the nut 118 contacts with the frame as shown and the parts of the folding unit 28 are in the relative positions illustrated in Figs. 1, 4 and 7.

When the plunger 81 is moved upwardly the plunger 114 is also moved upwardly until the rocker frame 111 arrives at the intermediate position shown in dotted position, Fig. 9. Further upward movement of the plunger 114 results in the rocker frame 111 being tipped from the intermediate position illustrated in dotted lines to the extreme upward position illustrated in dotted lines, Fig. 9, due to the fact that the stop nuts 119 contact with the frame 15 and thus cause the rocker frame 111 and the parts mounted thereon to be tipped backwardly within the bead ring to enable the bead to be easily positioned within the machine or taken out of it.

The guide roll 18 is rotatably mounted upon an arm 120 forming a portion of the rocker frame 111.

The side 70 of the fabric, as illustrated in Fig. 7, is folded over the bead core and over the side 71 which was previously folded by the folding unit 27, as illustrated in Figs. 7 and 7A, and the folding of the fabric over and around the bead core is at this point completed. A spring 108' holds the folding member 108 downwardly against the fabric during this folding operation.

A printing roller 121 prints upon the peripheral face of the fabric covered bead, as illustrated in Fig. 1, the same being rotated by friction with said bead and supplied with ink from a fountain roll 122 and ink fountain 123, all of the ink mechanism being supported upon a bracket 124 fast to the frame 15.

The roll 18, it will be understood, performs the function of holding the completed bead against the periphery of the printing roller 121 and the roll 17 acts not only to guide the bead core 10 but to hold it in contact with the fabric 19 which is being fed to it by the mechanism hereinbefore described, it being understood that said mechanism is substantially the same in operation as the feed mechanism described in my before-mentioned application.

The auxiliary feed roll 22 is rotated more rapidly than the feed rolls 69 coacting with the idler feed roll 72. The auxiliary feed roll 22 is fastened to a shaft 125, see Fig. 2, which has a sprocket gear 126 fastened thereto, driven by a chain 127 which is in turn driven by a sprocket gear 128 fast to a shaft 129 to which a spur gear 130 is fastened, which meshes into another spur gear 131 fast to the shaft 33.

It will be understood that the means for tipping the rocker frames 76 and 99 are substantially the same in construction and operation as the means for tipping the rocker frame 111 as illustrated in Fig. 9 and hereinbefore fully described.

The general operation of the mechanism hereinbefore and to a large extent in general set forth is as follows:—The folding units 26, 27 and 28 are placed in the uppermost position by operating the valve 86 to move the piston 83 upwardly, together with the plunger 81, the cross head 80 and the vertical plungers 79, 81 and 114. The bead core is now placed in position relatively to the feed rolls as illustrated in Fig. 1. The operator then turns the valve 86, whereupon the piston 83 moves downwardly carrying with it the plunger 81 and the plungers 79, and 114 with the folding elements attached thereto and also with the rolls 17 and 18 in operative positions. The operator then presses the treadle 62 which operates the different feed rolls to start the bead core rotating. At the same time the operator takes the loose end of the fabric 19, which is lying over the roll, 23, and sticks it on to the outer surface or periphery of the bead core 10. The fabric is carried forward over the roll 24 in contact with the periphery of the bead 10, the bead 10 being at this time rotating, carries the fabric along with it and the fabric is folded by the folding units 26, 27 and 28 as hereinbefore described, and is printed by the printing roller 121. The bead core now being covered with the fabric forming the completed bead with the printing on its periphery, the fabric is severed by the operator without stopping the machine, as the end thereof which was first applied to the bead core approaches the first folding unit 26. The machine is allowed to run until the last end of the fabric has passed the folding unit 28. The operator then removes his foot from the treadle and the rotation of the bead stops. The folding units are then moved upwardly and backwardly by operating the valve 86, as hereinbefore described, and the completed bead, wrapped and printed, can then be removed from the machine.

I claim:

1. A machine for covering tire beads having, in combination, means for supporting and guiding a ring constituting a tire bead core, means to feed a strip of fabric to the periphery of said ring embodying a pair of rotary feed rolls, an auxiliary feed roll positioned in advance of said pair of feed rolls, means to guide sheet material to said auxiliary feed roll, and means to rotate said auxiliary feed roll at a greater surface speed than that of said pair of feed rolls.

2. A machine for covering tire beads having, in combination, means for supporting and guiding a ring constituting a tire bead core, means to feed a strip of fabric to the periphery of said ring embodying a pair of rotary feed rolls, an auxiliary feed roll positioned in advance of said pair of feed rolls, means to guide sheet material to said auxiliary feed roll and from said auxiliary feed roll to said pair of feed rolls, and means to rotate said auxiliary feed roll at a greater surface speed than that of said pair of feed rolls.

3. A machine for covering tire beads having, in combination, means for feeding a strip of fabric to the outer perimeter of a bead core embodying means to press the outer perimeter of the core against the fabric, means to simultaneously fold said fabric against opposite sides of said bead, a feed roll adjacent to and at the rear of said folding means adapted to engage one side of said bead, and a flange thereon engaging the outer perimeter of said bead, and a rotary folder oppositely disposed to said feed roll and positioned to engage one edge portion of the fabric and fold it over toward said feed roll and against the inner perimeter of the bead, the periphery of said folder lying in a plane intersecting the inner perimeter of the bead and diverging rearwardly and inwardly therefrom from the line of intersection of said plane therewith.

4. A machine for covering tire beads having, in combination, means for feeding a strip of fabric to the outer perimeter of a bead core embodying means to press the outer perimeter of the core against the fabric, means to simultaneously fold said fabric against opposite sides of said bead, a feed roll adjacent to and at the rear of said folding means adapted to engage one side of said bead, and a flange thereon engaging the outer perimeter of said bead, and a rotary folder oppositely disposed to said feed roll and positioned to engage one edge portion of the fabric and fold it over toward said feed roll and against the inner perimeter of the bead, the median axial lines of said feed roll and folder lying in planes at an angle to each other.

5. A machine for covering tire beads having, in combination, means for feeding a strip of fabric to the outer perimeter of a bead core embodying means to press the outer perimeter of the core against the fabric, means to simultaneously fold said fabric against opposite sides of said bead, a feed roll adjacent to and at the rear of said folding means adapted to engage one side of said bead, and a flange thereon engaging the outer perimeter of said bead, and a rotary folder oppositely disposed to said feed roll and positioned to engage one edge portion of the fabric and fold it over toward said feed roll and against the inner perimeter of the bead, the median axial line of said feed roll being approximately radial to said bead and the median axial line of said folder lying in a plane intersecting the axis of the feed roll, whereby the periphery of said folder diverges rearwardly and inwardly from the inner perimeter of the bead.

In testimony whereof I have hereunto set my hand.

FRED D. FOWLER.